Sept. 5, 1967  B. G. PERSSON  3,339,906
RESILIENT SUPPORT FOR SEATS
Filed Sept. 10, 1965  2 Sheets-Sheet 1

United States Patent Office 3,339,906
Patented Sept. 5, 1967

3,339,906
RESILIENT SUPPORT FOR SEATS
Bror Göte Persson, Oskarshamn, Sweden
Filed Sept. 10, 1965, Ser. No. 486,346
8 Claims. (Cl. 267—1)

This invention relates to a resilient support for seats of the kind used in motor vehicles, such as trucks, and comprising a fixed lower part and an upper part which is depressable relative the lower part against the action of a spring device.

When the vehicle is running on uneven roads the driver may be subjected to vertical accelerations of the order of 2g, which means that the force depressing the seat equals twice the weight of the driver. Consequently, the heavier driver exerts a considerably higher load of the spring device of the seat support than a lighter driver, resulting in a certain risk of the spring device striking the bottom. However, this risk can be avoided by the provision of a progressively acting spring device.

A general object of the invention is to provide a simple construction of such a spring device for seat supports of the kind referred to, which is adjustable such as to be comfortable for every driver independent of his weight.

This and other objects are attained by a resilient support means according to the invention, comprising a link system, at least one coil spring operative between a fixed point and a movable point of said link system and counteracting downward movement of said seat, a roller mounted at one end of said coil spring, and a cam means, said movable point being the contact point between said roller and said cam means, said cam means including at least two cam surfaces of different shape and being movable to present a selected one of said cam surfaces to said roller.

Figure 1:
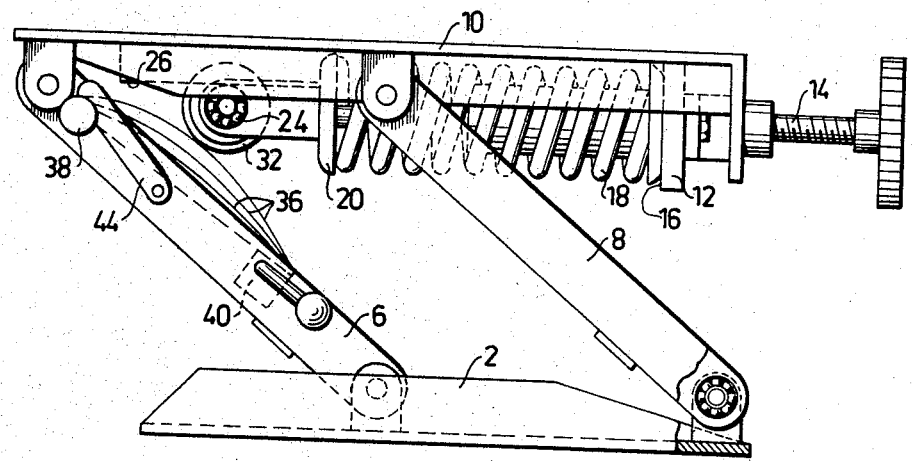
Figure 2:
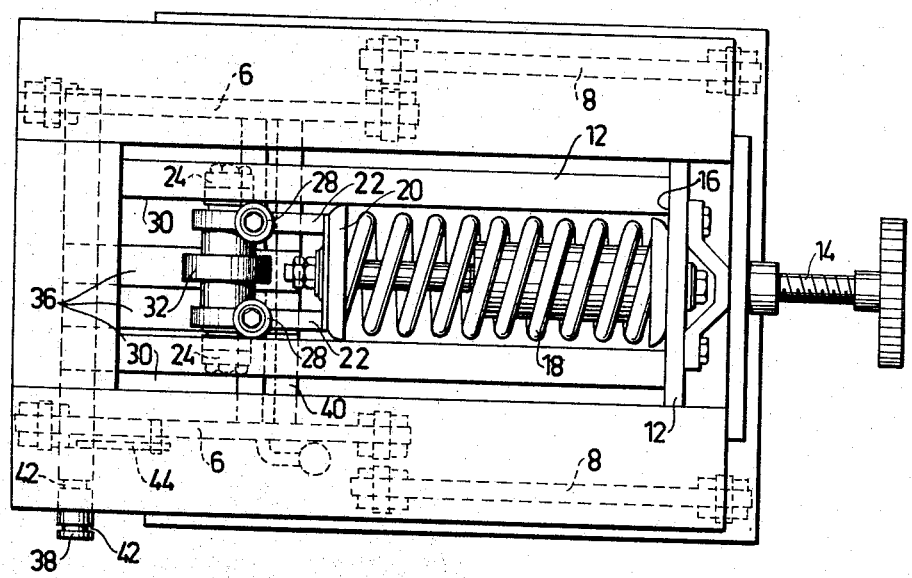
Figure 3:
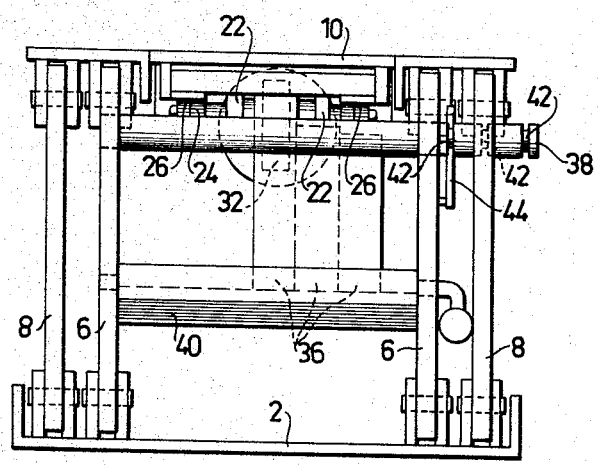

The invention will now be described with reference to the accompanying drawing, which illustrates an embodiment of the invention and in which:

FIG. 1 is a side elevation of the resilient seat support;
FIG. 2 is a top view of the support;
FIG. 3 is an end elevation of the support shown in FIG. 1.

The lower part of the support for the seat consists of a base 2 adapted to be secured to the floor in a motor vehicle. The base has four fixed bearings 4 for two pairs of pivoted links 6, 8 of parallel linkages. The upper ends of the links art articulated to and carry the upper part 10 of the support on which a seat cushion and a back rest, not shown, are mounted.

Displaceably mounted on the lower side of the upper part 10 is a slide 12 the longitudinal position of which is determined by an adjusting screw 14. One end of the slide forms an abutment 16 for one end of a compression coil spring 18, the other end of which bears on a spring seat 20 connected to a stirrup 22 which in turn is displaceably mounted on a pair of rollers 24 adapted to run on individual ways 26 on the lower side of the slide 12 and another pair of rollers 28 adapted to run on other individual ways 30 on side parts of the slide. Between said ways there is a free space for another roller or pair of rollers 32 mounted on the shaft 34 of said first mentioned rollers. Suitably all the rollers are in form of ball bearings.

The spring 18 is compressed by abutment of the roller 32 against one of three integral cam surfaces 36 pivotably mounted between the links 6 on a shaft 38 and having a common back surface 39.

Rotatably mounted between the links 6 is an eccentric arm 40 with quadrangular cross section extending parallel to the pivot shaft 38. This arm 40 is manually rotatable to present a selected one of its side surfaces to the common back 39 of said cam surfaces, which accordingly can be brought to four different fixed positions towards the roller 32.

The pivot shaft 38 of the cam surfaces can be displaced laterally in front of the roller 32 to three positions to present a selected one of the cam surfaces to the roller 32. By means of grooves 42 in the shaft 38 and an arm 44, one end of which is rotatably mounted in one of the links 6, the shaft 38 can be optionally locked in one of these three positions.

The above described spring device is progressively acting for the following reasons. If the upper part of the seat support is loaded by the weight of a driver the roller 32 is acted upon by a component of force which tends to displace the roller against the action of the spring, which will be compressed in proportion to the magnitude of the component of force. The inclination of the tangent to the roller at a point where the selected cam surface is in contact with the rollers determines the magnitude of the component force. The more the tangent is inclined, the smaller is said component which means that the spring device is acting progressively.

A suitable curvature of the cam surfaces permits the spring characteristics of the spring device to be adapted such that drivers of different weights will cause practically the same downward deflection for equal shocks. Accordingly, by having three different cam surfaces and four different positions of each of these cam surfaces in respect of the roller 32 the range of permissible loads for the seat is much extended.

Obvious changes may be made in the device illustrated herein without departing from the scope of the invention and all matter contained herein is intended to be interpreted in an illustrative and not limiting sense.

What I claim is:

1. Resilient support means for a seat, especially for motor vehicles, said support means comprising a link system, at least one coil spring operative between a fixed point and a movable point of said link system and counteracting downward movement of said seat, a roller mounted at one end of said coil spring, and a cam means, said movable point being the contact point between said roller and said cam means, said cam means including at least two cam surfaces of different shape and being movable to present a selected one of said cam surfaces to said roller.

2. Resilient support means for a seat according to claim 1, in which said cam means constitutes a unitary element.

3. Resilient support means for a seat according to claim 2, in which said cam surfaces are provided side by side on said unitary element and said unitary element is mounted on a shaft extending laterally in respect of said cam surfaces, said unitary element being displaceable laterally in front of said roller to present a selected one of said cam surfaces to said roller.

4. Resilient support means for a seat according to claim 3, in which said unitary element is swingable about said shaft and further comprising means for holding said unitary element in at least two different swinging positions.

5. Resilient support means for a seat according to claim 4, in which said holding means comprises an element of polygonal cross section rotatably mounted and positioned such as to present in different rotating positions support surfaces for said unitary element located at different distances from its axis of rotation.

6. Resilient support means for a seat, especially for motor vehicles, said support means comprising a parallelogram link system between said seat and a base member, said parallelogram link system comprising two pairs of links extending upwards from said base member, said pairs of links supporting a frame for said seat parallel with said base member, a coil spring mounted on said frame, a roller mounted at one end of said coil spring, a cam means mounted on one of said pairs of links and cooperating with said roller, said coil spring being operative between a point on said frame and a movable point on said cam means and counteracting downward swinging movement of said pairs of links, said movable point being the contact point between said roller and said cam means, said cam means including at least two integral cam surfaces of different shape located side by side, said roller being movable along a selected one of said cam surfaces, said cam means being mounted on a shaft extending between the links and being laterally displaceable in front of said roller to present a selected one of said cam surfaces to said roller.

7. Resilient support means for a seat according to claim 6, in which said cam surface means is adjustable in at least two operative swinging positions.

8. Resilient support means for a seat according to claim 7, in which the number of said operative positions is four and determined by the four surfaces of an eccentric element with quadrangular cross section extending parallel to said shaft and supporting said cam surface means on a selected one of said surfaces.

References Cited

UNITED STATES PATENTS 2,936,818   5/1960   Harrington et al. _____ 248—399

FOREIGN PATENTS 1,135,786   8/1962   Germany.
930,903   7/1963   Great Britain.

R. M. WOHLFARTH, *Assistant Examiner.*

ARTHUR L. LA POINT, *Primary Examiner.*